Sept. 5, 1967   H. P. BYRNES ET AL   3,339,294
EDUCATIONAL DEVICE
Filed May 27, 1965

INVENTORS
HERBERT P. BYRNES
ROBERT H. CADWALLADER

BY *John L. Stelig*

ATTORNEY

United States Patent Office 3,339,294
Patented Sept. 5, 1967

3,339,294
EDUCATIONAL DEVICE
Herbert P. Byrnes, Hillside Lake, Hopewell Junction, N.Y. 12533, and Robert H. Cadwallader, Forest View Road, Fishkill, N.Y. 12524
Filed May 27, 1965, Ser. No. 459,393
2 Claims. (Cl. 35—26)

ABSTRACT OF THE DISCLOSURE

An educational device comprising a block of carvable material that has been marked by scoring, sawing and drilling to indicate the material to be removed in forming a flexible object such as a chain.

This invention relates to an educational device through the use of which a child or adult may achieve a certain degree of skill in carving as a hobby or as a means of rehabilitation.

More particularly it is the aim of the invention to provide a block of material that has been prepared by having certain cuts or marks made thereon that may be used as a guide in carving an object.

Another object of the invention is to provide a block of material in which certain guiding cuts form parts that will be removed by breakage or cutting.

Figure 3:
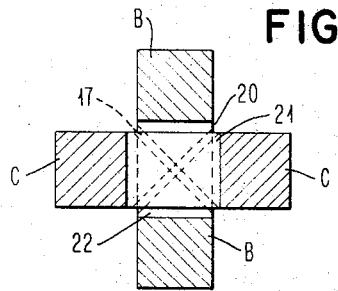
Figure 1:
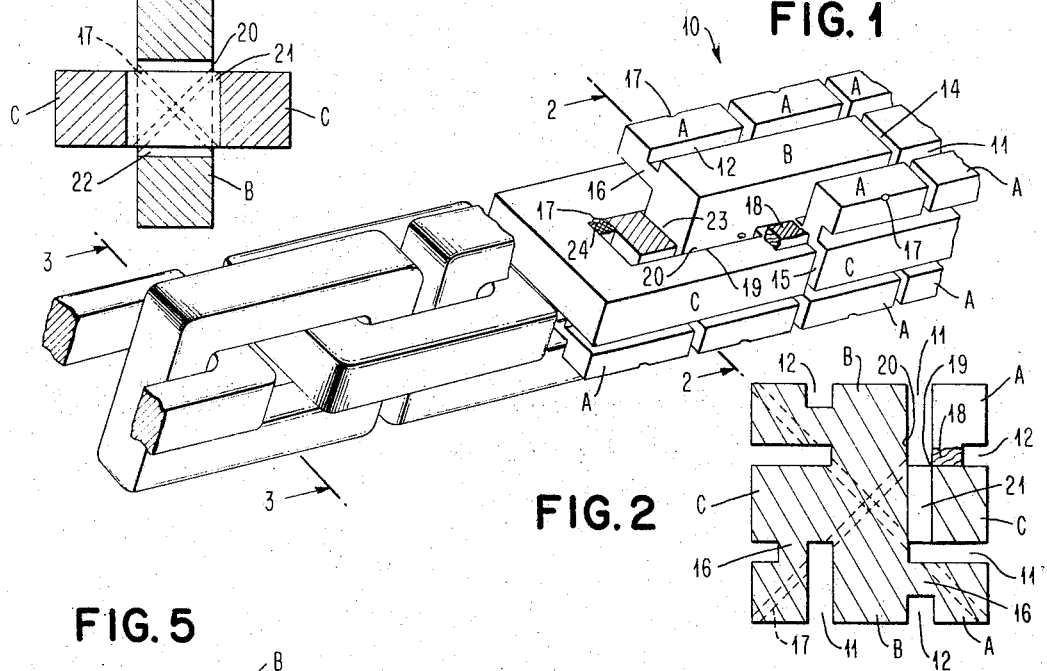
Figure 2:
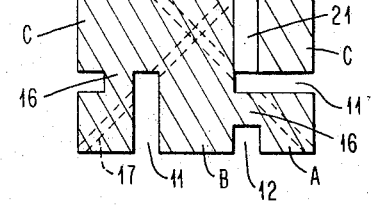
Figure 5:
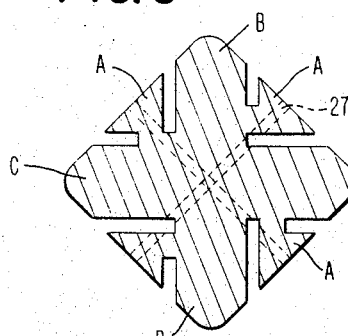
Figure 4:
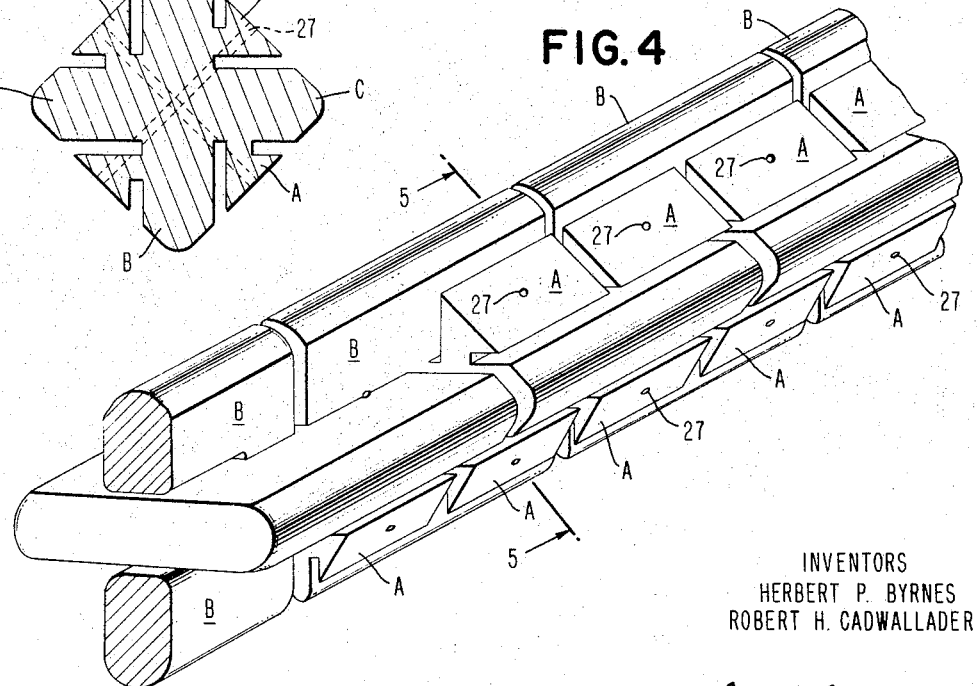

A more clear conception of further objects advantages and a better understanding of the invention may be had from the following specification when read in conjunction with the accompanying drawing in which:

FIG. 1 is a view in perspective of a block that has been pre-cut to guide a carver in forming a chain, FIG. 2 is a vertical cross section taken through line 2—2 of FIG. 1, FIG. 3 is a vertical cross section taken through line 3—3 of FIG. 1 in which certain operations are indicated, FIG. 4 is a view in perspective of a modified form of block and FIG. 5 is a vertical cross section taken along line 5—5 of FIG. 4.

Wood carving is an old and well known art by which many beautiful and intricate objects may be made. Among the many interesting and intriguing objects is a chain carved from one block of material. The two blocks illustrated while they differ in configuration are both for teaching the carving of such a chain. In spite of the fact that the following description deals with the carving of a block of wood, using a knife it is understandable that blocks of plastic, stone, soft metal (such as aluminum) and the like could well be carved using power tools. If power tools are used a rotary cutter such as that used for undercarving plastics is recommended. Also, whereas the blocks illustrated are precut to indicate certain portions to be removed, it is apparent that marking in ink or the like could be substituted.

The block, shown in FIG. 1 indicates four of the stages of carving followed in carving a chain from one block of wood. Starting at the right hand end; (1) the uncarved block, (2) the excess scrap removed, (3) the center of one end of a link has been removed to show the method of carving, and (4) the parts of three finished links.

The right hand end of FIG. 1 shows a block 10 which is scored or marked by sawing to form longitudinal grooves 11 and 12, and lateral grooves 14 and 15. Grooves 11 are deeper than grooves 12 thereby forming a tail 16 by which segments or scraps A are connected to the arms B and C of a body of cruciform shape. These arms B and C are later formed into the links of the chain.

The arms and scraps are separated alternately by grooves 14 and 15. A series of holes 17 are drilled through the block from one corner to the other. Each hole passes through the center of a scrap A and the center of the block. These drilled holes form a hole at the confluence of the two arms of the cruciform body and will act as guides during the carving as will be described later.

Referring to FIG. 2 if the deep horizontal grooves 11 are extended in certain areas to meet the deep vertical grooves 11 the arms B and C of the links would be freed from the center portion of the block (see 21). Remembering this broad theory the details of carving a chain will now be described.

To start, the block is either held in the hand or may be clamped in a vice with the arms in the position shown in FIG. 2. The scraps A may then be removed by breaking off or cutting through the tails 16 thereby exposing the arms B and C as shown in the center of FIG. 1. If the scraps are broken off they usually leave a nub such as that at 18 which is easily shaved off to smooth the surfaces of the arms B and C. Using the point of the knife a line 19 is now scored on the upper horizontal surface of arm C that will pass through hole 17. A second line 20 is also scored on the vertical surface of arm B. A vertical cut is now made following the surface of arm B and a second cut paralleling the first cut is made following the line 19. It will be noted by referring to FIG. 1 that hole 17 is located in the center of the short side of the material (double cross hatched) that is to be removed to clear the center portion of the link. Also, it will be noted that both lines 19 and 20 extend a slight bit beyond the holes. These holes beside being guides for the lines 19 and 20 also provide a point at which the carver may insert the point of the knife to start carving out the center if the block. The wood between the cuts along line 19 is removed as seen in FIG. 1 until a half-way point is reached. The block is then turned 180° about its longitudinal axis and identical paralleling cuts are made until all the wood is removed as shown at 21 in FIG. 2. The same method is followed using line 20 as a guide to cut a horizontal channel 22 through arm B as seen in FIG. 2. Both channels are limited in length by the thickness of the individual link being formed.

The next step is to remove the wood at the bottom of groove 14 by cutting vertically downward between the ends of adjacent arms B as shown at 23 in FIG. 1. This insures that the vertical arm of one link will be free to move after the wood indicated by the double cross hatching 24 is removed thus freeing the leg of the broken link.

Only one half of the carving has been described in detail since the remaining half of the steps in forming a link are the same.

The block shown in FIGS. 4 and 5 is similar in most respects to that described above. The differences lie in the method of preparation. The block in FIG. 4 has the guide holes 27 drillled at 90° to the surface of the block whereas those i.e. 17 in FIG. 1 are drilled at forty-five degrees to the surface of the block. Conversely the saw cuts are made at forty-five degrees to the surface in the block of FIG. 4 and those of the block in FIG. 1 are at ninety degrees. The scraps A of FIG. 4 are consequently triangular in shape and so less prone to breakage during handling prior to carving than those of FIG. 1. Also the edges of the arms B and C that will form the links are easily rounded as a guide to the carver as to the radius of the finished links.

While only two forms of the invention are shown it is obvious that other forms of scoring and the locations of the guide holes may be varied to indicate to the amateur carver the cuts necessary to form other useful and beautiful objects.

We claim as our invention:

1. An educational device comprising a block of material capable of being carved, lines delineating a rough configuration of an object to be formed, a group of said lines extending parallel to each other and parallel to the axis of the block, a second group of said lines extending at right angles to the axis of said block, said first group of said lines outlining certain material to be removed as well as the faces of the object to be formed, said second group dividing portions of said block into parts of the object, and a series of holes drilled through said block from corner to corner to act as guides to locate material to be removed during the forming of said object.

2. An educational device comprising a block of wood, saw cuts delineating a rough configuration of the links of a chain, a group of said cuts extending parallel to the axis of said block, a second group of cuts extending at right angles to the axis of said block, said first group of said cuts outlining wood that is to be removed to expose a rough configuration of said links, said second group dividing said links roughly from each other, and a series of holes drilled through said block from corner to corner to act as guides in locating the cuts necessary to form and separate said links by carving.

References Cited

UNITED STATES PATENTS

| | | | |
|---|---|---|---|
| 1,242,325 | 10/1917 | Craven | 59—35 X |
| 1,895,814 | 1/1933 | Nelson | 35—26 |
| 3,032,881 | 5/1962 | Fengler | 33—23 |

EUGENE R. CAPOZIO, *Primary Examiner.*

H. S. SKOGQUIST, *Assistant Examiner.*